United States Patent
Zhao et al.

(10) Patent No.: US 8,902,719 B2
(45) Date of Patent: Dec. 2, 2014

(54) HEAT ASSISTED MAGNETIC RECORDING HEADS HAVING BILAYER HEAT SINKS

(71) Applicant: Seagate Technology LLC, Cupertino, CA (US)

(72) Inventors: Tong Zhao, Eden Prairie, MN (US); Ibro Tabakovic, Edina, MN (US); Michael C. Kautzky, Eagan, MN (US); Venkatram Venkatasamy, Edina, MN (US); Jie Gong, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/795,616

(22) Filed: Mar. 12, 2013

(65) Prior Publication Data

US 2013/0286804 A1 Oct. 31, 2013

Related U.S. Application Data

(60) Provisional application No. 61/638,080, filed on Apr. 25, 2012.

(51) Int. Cl.
| | | |
|---|---|---|
| G11B 11/00 | (2006.01) | |
| G11B 5/60 | (2006.01) | |
| G11B 5/31 | (2006.01) | |
| G11B 13/04 | (2006.01) | |
| G11B 5/00 | (2006.01) | |

(52) U.S. Cl.
CPC .............. *G11B 13/04* (2013.01); *G11B 5/6088* (2013.01); *G11B 2005/0021* (2013.01); *G11B 5/314* (2013.01)
USPC .................................... 369/13.33; 369/13.13

(58) Field of Classification Search
CPC ................ G11B 2005/0032; G11B 2005/0021
USPC ....................... 369/13.33, 13.13, 13.32, 13.17
See application file for complete search history.

(56) References Cited

U.S. PATENT DOCUMENTS

| | | |
|---|---|---|
| 7,002,228 B2 | 2/2006 | Deak |
| 7,262,936 B2 | 8/2007 | Hamann |
| 7,791,839 B2 | 9/2010 | Olson |
| 8,116,034 B2 | 2/2012 | Komura |
| 8,339,740 B2 | 12/2012 | Zou |
| 2003/0067717 A1 | 4/2003 | Garfunkel |
| 2005/0190496 A1 | 9/2005 | Hamann |
| 2007/0069383 A1 | 3/2007 | Suzuki |
| 2009/0073858 A1 | 3/2009 | Seigler |
| 2010/0128579 A1 | 5/2010 | Seigler |
| 2010/0214685 A1 | 8/2010 | Seigler |

(Continued)

OTHER PUBLICATIONS

PCT/US2013/038119 Search Report and Written Opinion issued Aug. 27, 2013.

*Primary Examiner* — Tan X Dinh
(74) *Attorney, Agent, or Firm* — Mueting, Raasch & Gebhardt, P.A.

(57) ABSTRACT

Disclosed herein is an apparatus that includes a near field transducer positioned adjacent to an air bearing surface of the apparatus; a first magnetic pole; and a heat sink positioned between the first magnetic pole and the near field transducer, wherein the heat sink includes a first and second portion, with the first portion being adjacent the near field transducer and the second portion being adjacent the first magnetic pole, the first portion including a plasmonic material, and the second portion including a diffusion blocking material.

19 Claims, 3 Drawing Sheets

(56) References Cited

U.S. PATENT DOCUMENTS

| | | |
|---|---|---|
| 2010/0309581 A1 | 12/2010 | Wu |
| 2011/0205863 A1 | 8/2011 | Zhao |
| 2012/0045662 A1* | 2/2012 | Zou et al. .................. 369/13.33 |
| 2012/0105996 A1 | 5/2012 | Katine |
| 2012/0127839 A1 | 5/2012 | Rawat |
| 2013/0064051 A1* | 3/2013 | Peng et al. .................. 369/13.33 |
| 2013/0107679 A1* | 5/2013 | Huang et al. ............... 369/13.33 |
| 2014/0004384 A1* | 1/2014 | Zhao et al. ................. 369/13.33 |

* cited by examiner

HEAT ASSISTED MAGNETIC RECORDING HEADS HAVING BILAYER HEAT SINKS

PRIORITY

This application claims priority to U.S. Provisional Application No. 61/638,080 entitled "BILAYER HEAT SINK FOR LOLLIPOP DESIGN NEAR FIELD TRANSDUCER" filed on Apr. 25, 2012, the disclosure of which is incorporated herein by reference thereto.

BACKGROUND

Heat assisted magnetic recording (HAMR) is a possible avenue for increasing the areal density of magnetic recording. As such, advances in HAMR are ongoing.

SUMMARY

Disclosed herein is an apparatus that includes a near field transducer positioned adjacent to an air bearing surface of the apparatus; a first magnetic pole; and a heat sink positioned between the first magnetic pole and the near field transducer, wherein the heat sink includes a first and second portion, with the first portion being adjacent the near field transducer and the second portion being adjacent the first magnetic pole, the first portion including a plasmonic material, and the second portion including a diffusion blocking material.

Also disclosed is an apparatus that includes a light source; a waveguide; a near field transducer positioned adjacent to an air bearing surface of the apparatus; a first magnetic pole; and a heat sink positioned between the first magnetic pole and the near field transducer, wherein the heat sink includes a first and second portion, with the first portion being adjacent the near field transducer and the second portion being adjacent the first magnetic pole, the first portion including a plasmonic material, and the second portion including a diffusion blocking material, wherein the light source, waveguide and near field transducer are configured to transmit light from the light source to the waveguide and finally the near field transducer.

Also disclosed is a disc drive that includes at least one actuator arm having a first and a second end; at least one head, wherein each arm has a head at the first end thereof and wherein each head includes: a near field transducer positioned adjacent to an air bearing surface of the apparatus; a first magnetic pole; and a heat sink positioned between the first magnetic pole and the near field transducer, wherein the heat sink includes a first and second portion, with the first portion being adjacent the near field transducer and the second portion being adjacent the first magnetic pole, the first portion including a plasmonic material, and the second portion including a diffusion blocking material wherein the light source and the near field transducer are configured to transmit light from the light source to the near field transducer in order to assist the magnetic writer with writing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Heat assisted magnetic recording (HAMR) heads include a high magnetic moment write pole adjacent to the near field transducer (NFT) and/or heatsink. Typically, the NFT and/or heatsink are made of gold or silver, which are noble metals. The occurrence of having a noble metal adjacent to a high magnetic moment material can lead to galvanic corrosion. Galvanic corrosion is an electrochemical process in which the corrosion of one metal is enhanced due to the presence of another metal when both metals are in electrical contact and immersed in an electrolyte.

Figure 1:
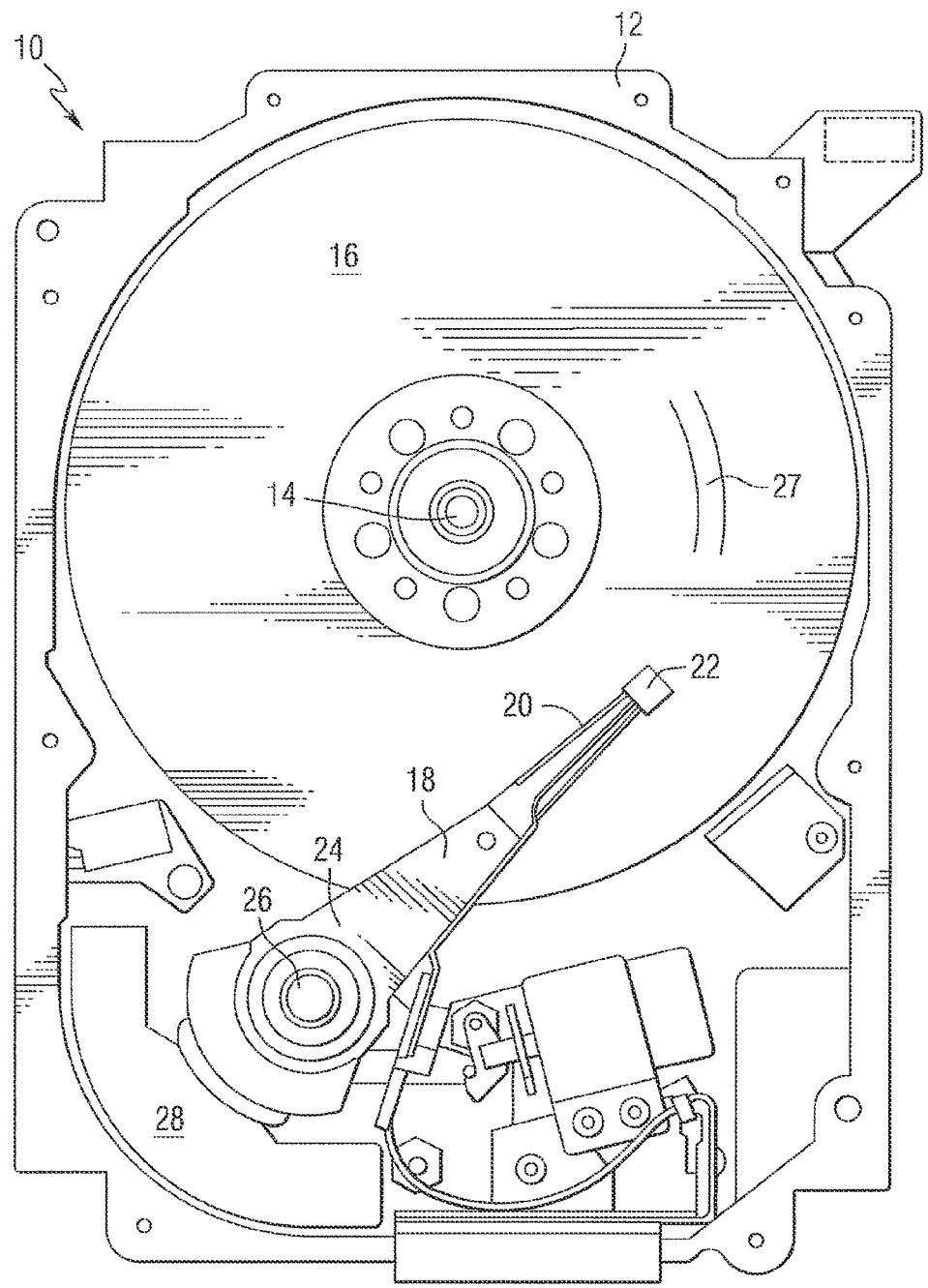
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with various aspects of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. While FIG. 1 shows a disc drive, the invention can be applied to other devices that include a transducer and a storage media, wherein the storage media is heated to facilitate switching of bits in the storage media.

Figure 2:
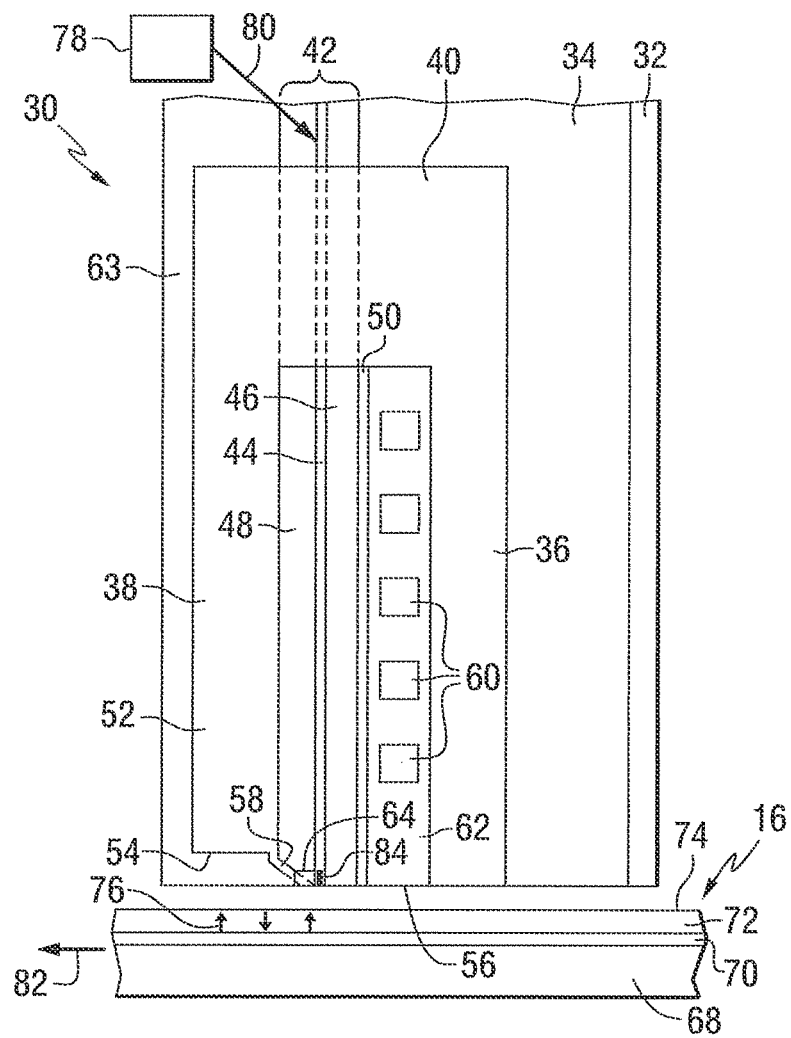
FIG. 2 is a side elevation view of a recording head constructed in accordance with an aspect of the disclosure.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material such as, for example, Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. The NFT can be any one of various types of NFTs, including, for example a nanorod type NFT, or a lollypop type NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
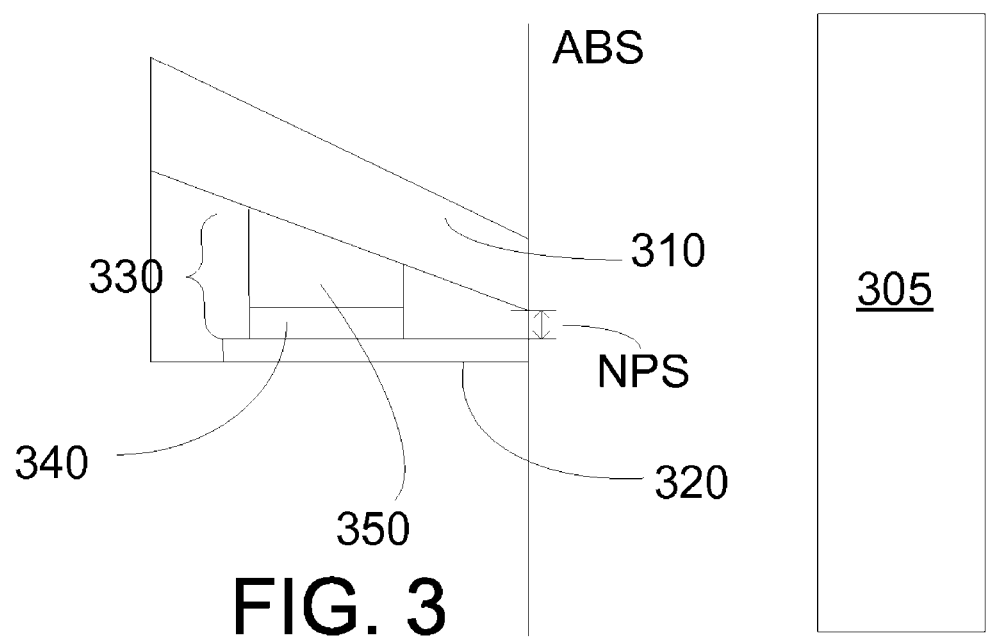
FIG. 3 is a schematic depiction of a cross section of a disclosed device that includes a disclosed bilayer heat sink.

FIG. 3 shows a disclosed apparatus. Such an apparatus includes a near field transducer (NFT) 320, a first magnetic pole 310, and a heat sink 330. The heat sink 330 is positioned between the first magnetic pole 310 and the NFT 320. The heat sink 330 includes a first portion 340 and a second portion 350. The first portion 340 is positioned adjacent the NFT 320 and the second portion 350 is positioned adjacent the first magnetic pole 310.

In some embodiments, the NFT 320 can be a peg/disc type of NFT, which can also be referred to as a lollipop structure, a nanorod type of NFT which can also be referred to as a gap type of NFT, or a funnel-type NFT for example. In some embodiments, the NFT can be a peg/disc type of NFT. The NFT acts to condense incoming light rays to a location on the magnetic media disc 305. The NFT 320 can be described as having an air bearing surface or being at the air bearing surface (ABS) of the device. The ABS is adjacent the magnetic media disc 305.

The NFT 320 can be made of a plasmonic material. Exemplary plasmonic materials can include, for example gold (Au), silver (Ag), copper (Cu), aluminum (Al), alloys thereof, or some combination thereof. In some embodiments, the NFT 320 can be made of, or include gold (Au), silver (Ag), or alloys thereof.

The heat sink 330, as discussed above includes a first portion 340 located adjacent the NFT 320 and a second portion 350 located adjacent the first magnetic pole. As such, disclosed heat sinks can be referred to as being bilayer heat sinks Previously utilized devices often exhibited issues of diffusion between the heat sinks and the magnetic pole. In embodiments where the heat sink is gold (for example) and the magnetic pole is FeCo (for example), diffusion can lead to significant reliability issues for the HAMR device. Diffusion barriers have been proposed, but often their use can have other drawbacks. For example, in embodiments where the diffusion layer is exposed to the ABS, they can increase the NFT-pole spacing or can have an increased risk of corrosion. In embodiments where the heat sink was replaced by diffusion barrier materials, the coupling efficiency of the NFT is greatly decreased. Disclosed heat sinks offer other approaches to overcoming the issues of diffusion.

The first portion 340 of the heat sink 330 generally includes a plasmonic material. Generally, the use of plasmonic materials in the first portion 340 can assist in preserving the NFT coupling efficiency. Exemplary plasmonic materials can include, for example gold (Au), silver (Ag), copper (Cu), aluminum (Al), alloys thereof, or some combination thereof. In some embodiments, the NFT 320 can be made of, or include gold (Au), silver (Ag), or alloys thereof. In some embodiments, the first portion 340 of the heat sink 330 can include materials such as those disclosed in commonly owned U.S. Patent Publication No. 2011/0205863, entitled, "HAMR NFT MATERIALS WITH IMPROVED THERMAL STABILITY", filed on Feb. 23, 2011; U.S. patent application Ser. No. 13/795,643 having attorney docket number 430.17229010, entitled "HAMR NFT MATERIALS WITH IMPROVED THERMAL STABILITY", filed on the same date as the instant application; and U.S. patent application Ser. No. 13/795,634 having attorney docket number 430.17123010, entitled, "NEAR FIELD TRANSDUCERS INCLUDING NITRIDE MATERIALS", filed on the same date as the instant application, the disclosures of which are incorporated herein by reference thereto.

The first portion 340 of the heat sink can be deposited at the same time as or in a single step with the NFT 320 (if they are the same material); or it can be deposited in a different step (even if they are the same material). In some embodiments, the first portion 340 of the heat sink 340 can be deposited using various methods, including for example electrodeposition, electrochemical plating methods, or physical vapor deposition (PVD) methods.

In some embodiments, the first portion 340 of the heat sink 330 can have a thickness that is chosen so as to better preserve the NFT coupling efficiency. In some embodiments, the first portion 340 of the heat sink can advantageously be as thin as possible so that the NPS is not increased greatly. The NPS is the space or gap (which can be filled with an insulating material for example) between the first magnetic pole 310 and the NFT 320, which can be referred to as the NFT to pole spacing (NPS). In some embodiments, the first portion 340 of the heat sink 330 can have a thickness from 15 nm to 100 nm. In some embodiments, the first portion 340 of the heat sink 330 can have a thickness from 30 nm to 70 nm. In some embodiments, where the NFT 320 is a peg/disc type NFT and the NFT and the first portion 340 of the heat sink 330 are the same material, the NFT 320 can be described as having a thickness of 25 nm. In some embodiments where the first portion 340 of the heat sink 330 and the NFT 320 are made of the same material, the two structures can be distinguished by the dimensions of the disc with respect to the overlying heat sink, differences in shapes, differences in deposition, or combinations thereof.

The second portion 350 of the heat sink 330 generally includes a diffusion blocking material. Generally, the use of diffusion blocking materials can assist in preventing diffusion between the NFT 320 material and the first magnetic pole 310. Further materials properties that can be considered in choosing a material for the second portion 350 of the heat sink 330 can include solubility with or in adjacent materials, general chemical stability and stability in relation to adjacent materials, and thermal conductivity of material for example. In some embodiments, a material that has a relatively low solid solubility with the NFT material, the first magnetic pole material, or both may be utilized. In some embodiments, a material that is relatively chemically stable with the materials in the NFT, the magnetic pole, or both can be utilized. In some embodiments, materials without risks or with minimal risks of interdifussion, intermetallic formation, or similar processes can be utilized. In some embodiments, materials that have an ability to block or limit interdifussion between the NFT and the first magnetic pole can be utilized. In some embodiments, materials that have a relatively high thermal conductivity can be utilized. This can provide for better heat-sinking. In some embodiments where the second heatsink layer is not exposed to the ABS, requirement for corrosion resistance can be relaxed. This could lead to a broader choice in materials.

In some embodiments, the second portion 350 of the heat sink 330 can be deposited using various methods, including for example electrodeposition, electrochemical plating methods, or physical vapor deposition (PVD) methods. In some embodiments, the second portion 350 of the heat sink 330 can include W, TiW, NiP, Rh, Ru, Ti, Ta, TiC, TiN, TiCN, TiPd, $Ti_3Pd$, TaC, TaN, TaCN, WN, WCN, WTiN, $ZrB_2$, $TiB_2$, $HfB_2$, $MgB_2$, $VB_2$, TaN, TiN, ZrN, or combinations thereof. In some embodiments, the second portion 350 of the heat sink 330 can include W, TiW, NiP, Rh, Ru, Ti, Ta, or combinations thereof. The second portion 350 of the heat sink 330 can generally span the distance from the first portion 340 of the heat sink 330 to the first magnetic pole 310.

Disclosed devices can include a space or gap (which can be filled with an insulating material for example) between the first magnetic pole 310 and the NFT 320. This space can be referred to as the NFT-pole space or spacing, which is shown in FIG. 3 as NPS. In some embodiments, disclosed devices can have a NPS that is not greater than 50 nm. In some embodiments, disclosed devices can have a NPS that is not greater than 20 nm.

Thus, embodiments of HEAT ASSISTED MAGNETIC RECORDING HEADS HAVING BILAYER HEAT SINKS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   a near field transducer positioned adjacent to an air bearing surface of the apparatus;
   a first magnetic pole; and
   a heat sink positioned between the first magnetic pole and the near field transducer,
      wherein the heat sink comprises a first and second portion,
         with the first portion being adjacent the near field transducer and
         the second portion being adjacent the first magnetic pole,
         the first portion comprising a plasmonic material and having a thickness from about 15 nm to 100 nm, and
         the second portion comprising a diffusion blocking material.

2. The apparatus according to claim 1, wherein the first portion has a thickness from about 30 nm to about 70 nm.

3. The apparatus according to claim 1, wherein the first portion comprises Au, Ag, Al, Cu, alloys thereof, or combinations thereof.

4. The apparatus according to claim 1, wherein the first portion comprises Au, Ag, Cu, Al, or combinations thereof.

5. The apparatus according to claim 1, wherein the second portion comprises W, TiW, NiP, Rh, Ru, Ti, Ta, TiC, TiN, TiCN, TiPd, $Ti_3Pd$, TaC, TaN, TaCN, WN, WCN, WTiN, $ZrB_2$, $TiB_2$, $HfB_2$, $MgB_2$, $VB_2$, TaN, TiN, ZrN, or combinations thereof.

6. The apparatus according to claim 1, wherein the second portion comprises W, TiW, NiP, Rh, Ru, Ti, Ta, or combinations thereof.

7. The apparatus according to claim 1, wherein the near field transducer comprises a peg and disc.

8. The apparatus according to claim 7, wherein the first portion of the heat sink is adjacent the disc of the near field transducer.

9. The apparatus according to claim 8, wherein the thickness of the disc is about 25 nm.

10. The apparatus according to claim 1, wherein the apparatus has a NFT-Pole space that is defined by the distance between the near field transducer and the write pole at the air bearing surface of the apparatus.

11. The apparatus according to claim 10, wherein the NFT-Pole space is not greater than about 50 nm.

12. An apparatus comprising:
   a light source;
   a waveguide;
   a near field transducer positioned adjacent to an air bearing surface of the apparatus;
   a first magnetic pole; and
   a heat sink positioned between the first magnetic pole and the near field transducer,
      wherein the heat sink comprises a first and second portion,
         with the first portion being adjacent the near field transducer and
            the second portion being adjacent the first magnetic pole,
            the first portion comprising a plasmonic material and having a thickness from about 15 nm to about 100 nm, and
            the second portion comprising a diffusion blocking material,
   wherein the light source, waveguide and near field transducer are configured to transmit light from the light source to the waveguide and finally the near field transducer.

13. The apparatus according to claim 12, wherein the first portion has a thickness from about 30 nm to about 70 nm.

14. The apparatus according to claim 12, wherein the first portion of the heat sink comprises Au, Ag, Cu, Al, or combinations thereof.

15. The apparatus according to claim 12, wherein the second portion of the heat sink comprises W, TiW, NiP, Rh, Ru, Ti, Ta, TiC, TiN, TiCN, TiPd, $Ti_3Pd$, TaC, TaN, TaCN, WN, WCN, WTiN, $ZrB_2$, $TiB_2$, $HfB_2$, $MgB_2$, $VB_2$, TaN, TiN, ZrN, or combinations thereof.

16. The apparatus according to claim 12, wherein the second portion comprises W, TiW, NiP, Rh, Ru, Ti, Ta, or combinations thereof.

17. An apparatus comprising:
   a near field transducer positioned adjacent to an air bearing surface of the apparatus;
   a first magnetic pole; and
   a heat sink positioned between the first magnetic pole and the near field transducer,
      wherein the heat sink comprises a first and second portion,
         with the first portion being adjacent the near field transducer and
            the second portion being adjacent the first magnetic pole,
            the first portion comprising a plasmonic material and
            the second portion comprising NiP.

18. The apparatus according to claim 17, wherein the first portion comprises Au, Ag, Al, Cu, alloys thereof, or combinations thereof.

19. The apparatus according to claim 17, wherein the first portion of the heat sink has a thickness from about 30 nm to about 70.

* * * * *